United States Patent
Fang et al.

(10) Patent No.: US 6,347,978 B1
(45) Date of Patent: Feb. 19, 2002

(54) COMPOSITION AND METHOD FOR POLISHING RIGID DISKS

(75) Inventors: Mingming Fang, Naperville, IL (US); Christopher C. Streinz, Smyrna Mills, ME (US); Shumin Wang, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 09/425,473

(22) Filed: Oct. 22, 1999

(51) Int. Cl.$^7$ .............................. B24B 1/00; C09C 1/68
(52) U.S. Cl. ............................. 451/28; 451/60; 51/307; 51/308; 51/309; 438/693
(58) Field of Search .................... 51/307, 308, 309; 451/28, 60; 438/693, 692

(56) References Cited

U.S. PATENT DOCUMENTS

| | | |
|---|---|---|
| 4,475,981 A | 10/1984 | Rea |
| 4,588,421 A | 5/1986 | Payne |
| 4,696,697 A | 9/1987 | Kitano et al. |
| 4,769,046 A | 9/1988 | Senda et al. |
| 4,915,710 A | 4/1990 | Miyazaki et al. |
| 4,929,257 A | 5/1990 | Miyazaki et al. |
| 5,084,071 A | 1/1992 | Nenadic et al. |
| 5,441,788 A | 8/1995 | Bloomquist et al. |
| 5,527,423 A | 6/1996 | Neville et al. |
| 5,735,963 A | 4/1998 | Obeng |
| 5,849,051 A | 12/1998 | Beardsley et al. |
| 5,849,052 A | 12/1998 | Barber |
| 5,954,997 A | 9/1999 | Kaufman et al. |
| 5,958,288 A | 9/1999 | Mueller |
| 5,981,454 A | 11/1999 | Small |
| 6,117,783 A * | 9/2000 | Small et al. ................... 51/308 |

FOREIGN PATENT DOCUMENTS

| | | |
|---|---|---|
| EP | 831 136 A2 | 3/1998 |
| WO | WO 96/16436 | 5/1996 |
| WO | WO 99/47618 | 9/1999 |

* cited by examiner

Primary Examiner—M. Rachuba

(57) ABSTRACT

A method for polishing computer rigid disks comprising bringing at least one surface of the rigid disk into contact with a polishing pad and applying a composition to the rigid disk comprising at least one hydroxylamine additive and colloidal silica to give a polished rigid disk.

8 Claims, No Drawings

COMPOSITION AND METHOD FOR POLISHING RIGID DISKS

BACKGROUND OF THE INVENTION

1. Field of the Invention

This invention concerns polishing compositions and methods for using the polishing compositions to polish rigid disks. The compositions generally include colloidal silica and at least one hydroxylamine polishing additive. More particularly the compositions and method of this invention are adapted for polishing electroless nickel deposited rigid disks that are used in computer hard drives.

2. Description of the Related Art

There exists a continuing desire to miniaturize electronic components used in the computer and electronics industries. The driving force for miniaturization in rigid disks is similar to that in the semiconductor industry. Customers are demanding continually increasing storage capacity in rigid disks. At the same time the design rules used by computer manufacturers call for smaller hard drives. The only solution available to rigid disk manufacturers is to increase the storage density of the magnetic media.

Miniaturization has created component quality concerns, many of which are resolved by the precise polishing of computer and electronic substrate materials for magnetic disks and semiconductors. As a result, identifying methods and compositions that can produce an essentially defect free electronic substrate surface has become crucial in the manufacture of smaller and smaller computer and electronic substrates.

Dispersions and chemical mechanical polishing (CMP) slurries have been developed for use in conjunction with semiconductor device manufacture. However, few of the commercially available dispersions or CMP slurries have been evaluated in rigid disk polishing applications. For example, U.S. Pat. No. 4,475,981 discloses polishing the metal surface of nickel plated blanks for rigid memory disks with a composition including ceric oxide or aluminum oxide powder, a water soluble chlorine-containing mild oxidizing agent and an aqueous suspension of colloidal alumina oxide or ceria oxide. U.S. Pat. Nos. 4,696,697 and 4,769,046, each disclose methods for polishing memory disks using an abrasive composition including alpha-aluminum oxide and a polishing accelerator such as nickel sulfate. The aluminum oxide polishing agent preferably has a minum particle size of 0.7–4 $\mu$m and a maximum particle size of 20 $\mu$m or less. U.S. Pat. Nos. 4,915,710 and 4,929,257 each disclose abrasive compositions suitable for polishing aluminum based substrates for magnetic recording disks. The composition disclosed includes an alumina abrasive, a polishing accelerator such as gluconic or lactic acid and colloidal alumina. In addition, U.S. Pat. No. 5,527,423 discloses an abrasive composition that is particularly useful in the method of this invention. Likewise, U.S. patent application Ser. No. 08/753,482, incorporated herein by reference, discloses a chemical mechanical abrasive composition including an oxidizer and a catalyst that is useful in the method of this invention. Polishing compositions including an alumina abrasive and a hydroxylamine additive are disclosed in U.S. Pat. No. 5,735,963.

Methods for polishing rigid disks are disclosed in U.S. Pat. Nos. 4,769,046, 5,084,071, and 5,441,788 each of which are incorporated herein by reference. U.S. Pat. No. 4,769,046 discloses a method for polishing a layer of nickel plated on a rigid disk using a composition comprising aluminum oxide and a polishing accelerator such as nickel nitrate, aluminum nitrate, or mixtures thereof. U.S. Pat. No. 5,084,071 discloses a method of chemical mechanical polishing and electronic component using a composition including abrasive particles that are not alumina, a transition metal chelated salt, a solvent for the salt, and a small but effective amount of alumina. Finally, U.S. Pat. No. 5,441,788 discloses a method for manufacturing a nickel phosphor recording disk including polishing the NiP substrate to a surface roughness to no less than 2.0 nm RMS.

Commercially available rigid disk polishing slurries are unable to meet the new rigid disk surface finish parameters. Furthermore, compositions that are presently known to be capable of polishing rigid disks are unable to polish rigid disks at a high rate and, at the same time, produce an acceptable surface finish. Therefore, there remains a need for polishing compositions that are capable of polishing rigid or hard disks at high rates with low defectivity, while providing a smooth surface finish.

SUMMARY OF THE INVENTION

The present invention is directed to compositions that are capable of polishing rigid disks at high rates with little or no increase in disk defectivity.

The present invention is also directed to compositions that are useful in conjunction with an abrasive polishing pad and/or in conjunction with a particulate abrasive for polishing electronic substrates.

The present invention is further directed to a method for removing nickel phosphide from an aluminum alloy-based rigid disk at high rates with polishing compositions.

In one embodiment, this invention is a polishing composition comprising water and at least one hydroxylamine additive wherein the polishing composition is combined with aqueous colloidal silica to give a polishing slurry or wherein the colloidal silica is embedded or applied to a polishing pad and thereafter the polishing composition is combined with the abrasive pad.

In still another embodiment, this invention is a method for polishing a rigid disk. The method includes the steps of: (a) providing a polishing composition comprising water and at least one hydroxylamine additive; (b) applying the polishing composition to at least one surface of the rigid disk; and (c) removing at least a portion of a metal layer from the rigid disk by bringing a polishing pad into contact with the surface of the rigid disk and moving the pad in relation to the rigid disk to give a polished rigid disk where colloidal silica is incorporated into the polishing composition, the polishing pad or both.

DESCRIPTION OF THE CURRENT EMBODIMENT

The present invention relates to polishing compositions of matter useful for polishing rigid disks. The present invention also relates to a method for polishing rigid disks using a polishing composition with specific additives including colloidal silica and hydroxylamine. In particular, the polishing composition of the invention are capable of polishing rigid disks at good rates to give polished rigid disks having excellent RMS roughness of less than about 0.6 nm at polishing rates greater than about 1.5$\mu$ inch/min/side.

Before describing the details of the various preferred embodiments of this invention, terms that are used herein will be defined. The term "rigid disk" refers to rigid disks and hard disks, such as an aluminum disk or nickel phosphor (NiP) plated aluminum disk upon which a magnetic media for computer memories will be coated.

An aspect of this invention is a method for polishing rigid disks that uses a polishing composition that has heretofore been unappreciated as being useful for polishing rigid disks. Polishing compositions useful for polishing rigid disks according to this invention include at least one hydroxylamine additive and colloidal silica. The polishing compositions of this invention may be combined with colloidal silica in a slurry to give a polishing composition that is useful for polishing rigid disks or the colloidal silica may be incorporated into a polishing pad and thereafter combined with an aqueous hydroxylamine solution. Examples of abrasive pads useful with polishing compositions of this invention are disclosed in U.S. Pat. Nos. 5,849,051 and 5,849,052 which are incorporated herein by reference.

The polishing compositions of this invention include at least one hydroxylamine additive. The term hydroxylamine additive as used herein refers to hydroxylamine ($NH_2OH$), derivatives of hydroxylamine, and hydroxylamine salts including, for example, nitrate salts, sulfate salts, phosphate salts and mixtures thereof. U.S. Pat. No. 5,735,963, the specification of which is incorporated herein by reference, discloses hydroxylamine derivatives and salts thereof that are useful in the chemical mechanical polishing compositions of this invention. Preferred hydroxylamine additives include hydroxylamine, hydroxylamine nitrate, hydroxylamine sulfate, hydroxylamine phosphate and mixtures thereof. Most preferred hydroxylamine additives are hydroxylamine, hydroxylamine nitrate, and mixtures thereof.

One or more hydroxylamine additives may be present in a chemical mechanical polishing compositions in an amount ranging from about 0.01 to about 25.0 weight percent and preferably from about 0.01 to about 10.0 weight percent. It is preferred that at least one hydroxylamine additive is present in the compositions of this invention in amounts ranging from about 0.01 to about 5.0 weight percent.

The polishing compositions of this invention may be combined with at least one colloidal silica abrasive prior to using the composition to polish a substrate such as a rigid disk. The colloidal silica may be added to the aqueous polishing composition to form an aqueous chemical mechanical polishing slurry. Alternatively, the colloidal silica may be incorporated into a polishing pad during or following the manufacture of the polishing pad. Thereafter, the aqueous polishing composition may be applied to a substrate being polished or directly to the polishing pad such that the colloidal silica in the polishing pad and the aqueous polishing composition work in unison to polish the substrate.

The colloidal silica abrasive may be any of a wide variety of aqueous colloidal silicas or gels that are available commercially. Colloidal silicas are stable dispersions of nanometer discrete silica particles suspended in water or some other medium. The production of colloidal silica is a well-known process which typically involves condensation and polymerization of a silica sol. For purposes of this disclosure, the term "colloidal silica" refers to small spherical silica particles having a mean particle size ranging from about 1 nm to about 200 nm that are preferably manufactured by condensation and polymerization processes. It is also preferred that essentially all of the colloidal silica particles have a mean average particle size of from about 40 nm to about 120 nm and most preferably from about 50 nm to about 100 nm. Furthermore, essentially all of the colloidal silica particles will fall within a particle size range or from about 1 to 3000 nm and preferably from about 5 to about 100 nm. The term "essentially all" means that at least 75 % of the colloidal silica particles are within the stated range.

The properties of several useful aqueous colloidal silicas are set summarized in U.S. Pat. No. 4,588,421, the specification of which is incorporated herein by reference. Examples of useful colloidal silicas include colloidal silicas manufactured by Nalco, Naperville, Ill. and sold under the tradenames NALCO® 1115, NALCO® 2326, NALCO® 1130, NALCO® 1030, NALCO® 1140, NALCO® 1934A, NALCO® 2327, NALCO® 1050, NALCO® 1060, NALCO® 2329, NALCO® 4291, and Bindzil 50/80 and Bindzil 40/170 each manufactured by Akzo Nobel.

The colloidal silica should be present in chemical mechanical polishing slurries of this invention in an amount ranging from about 0.5 to about 25 wt %, more preferably from about 1.0 wt % to about 12 wt % and most preferably in an amount ranging from about 1.0 to about 6.0 wt %.

pH is an important property of the polishing compositions of this invention. Generally, the composition will have a pH from about 1.5 to about 11.0. It is preferred that the pH ranges from about 2.0 to about 5.0 and most preferably from about 3.0 to about 4.0.

Other well known polishing composition additives may be incorporated alone or in combination into the polishing composition of this invention. A non-inclusive list of optional additives includes inorganic acids, organic acids, surfactants, alkyl ammonium salts or hydroxides, dispersing agents, oxidizing agents, additional abrasives, complexing agents, film forming agents and so forth.

The polishing machines used to manufacture polished rigid disks consist of a pair of platens. Both platens have the same size and can be rotated in opposite directions independently. A pair of identical pads are mounted on both upper and lower platens. The upper platen and the upper pad have a series of holes in which the polishing composition or slurry can be distributed evenly during the polishing. Depending on the specific machine, 25 to 45 disks (95 mm OD) can be loaded on the lower platen at one time by putting them into several carriers. These carriers have tiers that can be fit into both inner and outer gears on the lower platen. There are three or four motors (depending on the specific machine) which control the rotations of the platens and the carriers.

During the polishing, the upper and lower platens rotate in the opposite directions. By controlling the relative speeds between inner and outer gears, the carriers and the disks also rotate during the polishing. Therefore, both sides of the disks are polished evenly at the same time. For the second step polishing, the polishing time is typically 3 to 6 minutes. The pressure on each disk during polishing is typically 0.8 to 1.5 psi. The slurry flow rate is strongly dependent on the specific machine.

Rigid disk polishing usually consists of two steps: first-step polishing and second-step polishing (or fine polishing). The first-step polishing removes lots of the Ni-P materials on the rough surface of as-plated substrate. The resulting disks still have lots of scratches and other defects on the surface. Current technology requires defect-free and smooth surface for maximum storage capacity. The purpose of the second step polishing is to eliminate all surface defects and generate smooth surface. The compositions and polishing method of this invention are especially formulated for the second-step polishing although they can be used in first step polishing if desired. Rigid disks polished using methods and compositions of this invention exhibit surface roughness of less than about 0.6 nm and preferably less than 0.2 nm. In addition the rigid disks are polished at a high rate, typically in the range of 1.5 to 2.5 μinch/min/side or faster.

EXAMPLES

We have discovered compositions that are capable of polishing rigid disks at high rates and with low defectivity.

The following examples illustrate preferred several embodiments of this invention as well as several preferred methods of this invention.

Example 1

Rigid disks polished in a first stage polishing step were obtained from Seagate Technology. The rigid disks had a surface roughness of from about 30 to 50 Å. The rigid disks were polished with various abrasive containing polishing compositions. The rigid disks used were commercially available nickel/phosphor (NiP) coated disks with aluminum substrates. The disks used in these experiments had all undergone a pre-polishing.

The NiP coated aluminum rigid disks were polished using a table top polishing machine manufactured by Streuers, West Lake, Ohio. The table top polishing machine consisted of a Rotopol 31 base and a Rotoforce 3 downforce unit. Unless otherwise noted, twelve inch Polytex Hi pads, manufactured by Rodel, Inc. were used to polish the rigid disks in each Example.

The rigid disks were polished for 10 minutes per side using a platen speed of 150 rpm, a polisher carrier speed of 150 rpm, and a slurry flow rate of 100 ml/min. The polishing down force used was 50 Newtons. NiP removal rates were calculated by weighing the clean, dry rigid disk prior polishing and following polishing and converting the weight loss to a thickness loss using a NiP density of 8.05.

The surface characteristics of the polished rigid disks were analyzed using a TMS-2000 manufactured by Schmitt Measurement Systems, Inc. to determine surface roughness (Å) and peak to valley (P-V) height (Å).

Example 2

In this Example, the testing method described in Example 1 was used to evaluate polishing compositions including various abrasives. The abrasives evaluated included Bindzil 50/80 colloidal silica manufactured by Akzo Nobel, NALCO® PR-4291 colloidal silica and NALCO® 2329 colloidal silica each manufactured by Nalco, CAB-O-SPERSE®, SC-E fumed silica dispersion manufactured by Cabot Corporation, and SEMI-SPERSE® W-A355 fumed alumina dispersion manufactured by Cabot Corporation. Each of the compositions further included 0.25 wt % hydroxylamine nitrate. The polishing results are set forth in Table 1 below.

TABLE 1

| Run # | Solids Type | % Solids | pH | Rate (μm/min) | Comments | Roughness (Å) | P-V (Å) |
|---|---|---|---|---|---|---|---|
| 1 | Bindzil 50/80 (Colloidal silica) | 4 | 4 | 3.25 | No defects observed | 2.17 | 22.7 |
| 2 | Bindzil 50/80 (Colloidal silica) | 4 | 4 | 3.03 | No defects observed | 2.03 | 18.7 |
| 3 | Nalco PR-4291 (Colloidal silica) | 4 | 3.5 | 3.60 | No defects observed | 2.23 | 20.1 |
| 4 | Nalco PR-4291 (Colloidal silica) | 4 | 3.5 | 3.92 | No defects observed | 1.80 | 18.7 |
| 5 | Nalco 2329 (Colloidal silica) | 4 | 3.4 | 4.38 | No defects observed | 2.47 | 21.1 |
| 6 | Nalco 2329 (Colloidal silica) | 4 | 3.4 | 4.17 | No defects observed | 2.59 | 20.3 |
| 7 | SC-E Cabot fumed silica | 4 | 3.0 | 0.44 | pits & highly concentrated particles | 31.6 | 1236 |
| 8 | SC-E Cabot fumed silica | 4 | 3.0 | 0.46 | pits & highly concentrated particles | 36.7 | 1521 |
| 9 | W-A355 Cabot fumed alumina | 1.5 | 4.0 | 7.93 | visible pits | 5.45 | 153 |
| 10 | W-A355 Cabot fumed alumina | 1.5 | 4.0 | 8.56 | visible pits | 8.92 | 534 |

The polishing results show that the polishing abrasive is critical to achieving a good removal rate and a good surface finish. Specifically, the results indicate that polishing slurries including colloidal silica (runs 1–6) produced rigid disks with a uniformly polished surface at adequate removal rates. In contrast, compositions with filmed silica abrasives (runs 7–8) polished rigid disks with high defectivity at much lower rates than polishing compositions including colloidal silica. Compositions with fumed alumina on the other hand (runs 9–10) exhibited the highest removal rates and the worst defectivity results.

Example 3

In this Example, the polishing and testing methods described in Example 1 were used to evaluate the performance of polishing compositions including various colloidal silica abrasives. The polishing compositions used and the polishing results are reported in table 2, below.

TABLE 2

| Run # | Solids Type | % Solids | pH | Oxidizer | Rate (μin/min) | Comments - Olympus observations* | Roughness (A) | Peak to Valley (A) |
|---|---|---|---|---|---|---|---|---|
| 1 | Bindzil 50/80 | 4 | 4 | 0.25% hydroxylamine nitrate | 3.25 | No Defects Observed | 2.17 | 22.7 |
| 2 | Bindzil 50/80 | 4 | 4 | 0.25% hydroxylamine nitrate | 3.03 | No Defects Observed | 2.03 | 18.7 |
| 3 | Nalco PR-4291 | 4 | 3.5 | 0.25% hydroxylamine nitrate | 3.60 | No Defects Observed | 2.23 | 20.1 |
| 4 | Nalco PR-4291 | 4 | 3.5 | 0.25% hydroxylamine nitrate | 3.92 | No Defects Observed | 1.80 | 18.7 |
| 5 | Nalco 2329 | 4 | 3.4 | 0.25% hydroxylamine nitrate | 4.38 | No Defects Observed | 2.47 | 21.1 |
| 6 | Nalco 2329 | 4 | 3.4 | 0.25% hydroxylamine nitrate | 4.17 | No Defects Observed | 2.59 | 20.9 |
| 7 | Nalco 1050 | 4 | 3.2 | 0.25% hydroxylamine nitrate | 1.42 | No Defects Observed | 2.05 | 31.3 |
| 8 | Nalco 1050 | 4 | 3.2 | 0.25% hydroxylamine nitrate | 1.01 | No Defects Observed | 1.86 | 16.5 |
| 9 | Nalco 1060 | 4 | 3.4 | 0.25% hydroxylamine nitrate | 2.58 | No Defects Observed | 1.81 | 16.4 |
| 10 | Nalco 1060 | 4 | 3.4 | 0.25% hydroxylamine nitrate | 2.91 | No Defects Observed | 1.81 | 16.6 |
| 11 | Bindzil 50/80 | 5 | 4 | 0.25% hydroxylamine flitrate | 3.52 | No Defects Observed | 1.9 | 20.9 |
| 12 | Bindzil 50/80 | 5 | 4 | 0.25% hydroxylamine nitrate | 3.28 | No Defects Observed | 1.8 | 10.7 |
| 13 | Bindzil 40/170 | 5 | 4 | 0.25% hydroxylamine nitrate | 2.09 | No Defects Observed | 1.7 | 19.0 |
| 14 | Bindzil 40/170 | 5 | 4 | 0.25% hydroxylamine nitrate | 1.89 | No Defects Observed | 1.7 | 16.6 |

What we claim is:

1. A polishing composition comprising:
   water;
   from about 0.01 to 0.25 wt % of at least one hydroxylamine additive; and
   colloidal silica.

2. The chemical mechanical polishing composition of claim 1 having a pH of from about 2 to about 5.

3. The polishing composition of claim 1 including from about 0.5 wt % to about 25 wt % of colloidal silica.

4. The polishing composition of claim 1 including from about 1.0 to about 6.0 wt % colloidal silica.

5. The polishing composition of claim 1 wherein the hydroxylamine additive is selected from hydroxylamine, hydroxylamine salts and mixtures thereof.

6. The polishing composition of claim 5 wherein the hydroxylamine salt is hydroxylamine nitrate.

7. A chemical mechanical polishing composition comprising;
   water;
   from about 0.01 to 0.25 wt % hydroxylamine nitrate; and
   from about 1.0 to about 6.0 wt % colloidal silica.

8. The chemical mechanical polishing composition of claim 7 wherein the chemical mechanical polishing composition has a pH of from about 2.0 to about 5.0.

* * * * *